US 6,652,632 B2

(12) United States Patent
Moodycliffe et al.

(10) Patent No.: US 6,652,632 B2
(45) Date of Patent: Nov. 25, 2003

(54) FURNITURE POLISH COMPOSITION

(75) Inventors: Timothy I. Moodycliffe, Milwaukee County, WI (US); Lynn M. Werkowski, Milwaukee County, WI (US)

(73) Assignee: S. C. Johnson & Son, Inc., Racine, WI (US)

( * ) Notice: Subject to any disclaimer, the term of this patent is extended or adjusted under 35 U.S.C. 154(b) by 55 days.

(21) Appl. No.: 10/008,622

(22) Filed: Oct. 22, 2001

(65) Prior Publication Data

US 2003/0075073 A1 Apr. 24, 2003

(51) Int. Cl.[7] .............................. C09G 1/18; C09G 1/16; C09G 1/14
(52) U.S. Cl. ............................................. 106/3; 106/11
(58) Field of Search ........................ 106/3, 11

(56) References Cited

U.S. PATENT DOCUMENTS

| 4,113,677 | A | * | 9/1978 | Svedas et al. ............. 524/277 |
| 5,470,504 | A | | 11/1995 | Kiehn et al. ................ 252/49.6 |
| 5,681,377 | A | | 10/1997 | Lohr et al. ..................... 106/3 |
| 5,879,694 | A | | 3/1999 | Morrison et al. ........... 424/405 |
| 6,030,466 | A | * | 2/2000 | Myers, II .................... 134/38 |

FOREIGN PATENT DOCUMENTS

EP  0372205  6/1990

* cited by examiner

Primary Examiner—C. Melissa Koslow

(57) ABSTRACT

A furniture polish comprising a mineral oil, a silicone polish, and a bittering agent may be prepared. Such a composition may be made suitable for dispensing as a spray or mist by means of a non-pressurized spray apparatus by the addition thereto of a shear-thinning thixotropic thickener.

20 Claims, No Drawings

FURNITURE POLISH COMPOSITION

RELATED APPLICATION(S)

Not applicable.

FEDERALLY SPONSORED RESEARCH OR DEVELOPMENT

Not applicable.

BACKGROUND OF THE INVENTION

1. Field of the Invention

The present invention relates to a preferably wax-free, non-emulsion furniture polish composition of an improved nature, comprising petroleum distillates, and having a modified viscosity, but with shear properties appropriate for dispensing by means of non-aerosol spray bottles or pump apparatus. The composition further comprises a bittering agent so as to reduce likelihood of ingestion by a child.

2. Background Information

Petroleum distillate products are known for use in any number of products, but are also known to possess highly dangerous properties if ingested or aspirated. Accordingly, restrictions have been placed upon such products as petroleum distillate based furniture polishes, such that non-emulsion petroleum distillate liquid furniture polish products containing greater than 10 percent petroleum distillate essentially cannot at present be legally marketed in a trigger sprayer [16 CFR 1700.14 (a) (2)]. Since consumers prefer to apply such liquids as cleaning compositions by means of non-pressurized sprayers, such as trigger sprayers or pump bottles, it may be anticipated that consumers would welcome such petroleum distillate containing products as furniture polish in a spray bottle.

Wax-free furniture polish compositions are known in the prior art, such as taught by U.S. Pat. No. 5,681,377, of Lohr, et al. This patent teaches a wax-free silicone containing furniture polish comprising a low viscosity silicone fluid and either or both a silicone gum and a polydiorganosiloxane, water, and one or more suitable surfactants and solvents. In addition, other ingredients known to furniture polish formulators, such as propellants, fragrance, colors, preservatives, resin, or other conventional ingredients, may be added as desired or needed. These formulations encompass oil-in-water and water-in-oil emulsions, and lotion formulations. Such formulations may be dispensed by use of an aerosol dispenser, utilizing a hydrocarbon propellant.

However, no such wax-free furniture polish products containing more than 10 percent petroleum distillate, suitable for spray dispensing, are presently available which meet the requirements of the Consumer Product Safety Commission (hereinafter CPSC), that the petroleum distillate composition exhibit a viscosity of greater than 100 SUS (Saybolt Universal Seconds) at 1000 F. Therefore, it is considered desirable to provide thickened petroleum distillate based household products such as furniture oil which exceed the minimum viscosity requirements of the CPSC but which are capable of being dispensed as a spray or fine mist by means of a trigger spray or pump dispensing means in combination with a non-pressurized container. Moreover, to further protect consumers or children from ingestion of such household products, it is proposed to provide a bittering agent in the product to strongly discourage inhalation or ingestion. Still further, it is suggested that the petroleum distillate containing furniture polish be packaged in a container resistant to removal of the closure, and that the spray trigger mechanism or pump means be limited in capacity so as to restrict the amount of product dispensed with a single activation.

BRIEF SUMMARY OF THE INVENTION

To achieve the foregoing and other advantages, the present invention provides a liquid phase petroleum distillate furniture polish for spray application to a surface, wherein the viscosity of the liquid composition exceeds 100 SUS at a temperature of 100° F. The composition utilizes a shear thinning thixotropic thickener to provide a liquid of elevated viscosity when at rest, but which thins down to form a mist when sprayed, i.e. under shear pressure. The liquid then thickens after spraying to a higher viscosity before coming in contact with the surface toward which it has been directed. By providing such a modified petroleum distillate product, the present invention also overcomes several problems inherent in conventional furniture polishes. Conventional furniture polishes comprising petroleum distillate tend to run down vertical surfaces, due to low viscosity, making wiping more difficult. More importantly, such products are harmful if swallowed, particularly by a child. The modified polish of the present invention, however, runs more slowly down vertical surfaces, and thickens before contacting the back of a person's throat if sprayed in that direction. Due to the presence of a bittering agent, the polish of the present invention will strongly discourage tasting, or deliberate inhalation. Moreover, whereas many thin mineral oil based furniture polishes are difficult to spray from a non-pressurized container, because they form a stream rather than a mist when dispensed, the thickened polishes of the present invention form a spray upon dispensing through a trigger spray or pump dispenser mechanism, which spray rapidly returns to a high viscosity liquid after passage through the spray nozzle.

DETAILED DESCRIPTION OF THE INVENTION

Wax-free furniture polishes are known in the prior art, and generally are known to comprise silicone compounds and a solvent, and optionally propellants, surfactants, colorants, and odorants or perfumes, as well as other ingredients commonly employed in the preparation of polish formulations. The furniture polish of the present invention, however, constitutes a wax-free non-emulsion comprising a petroleum distillate solvent or carrier, such as mineral oil, a silicone polish, and a hydrocarbon cleaner or solvent. Applicants have found that the presence of a bittering or aversion agent, in addition to normally added polish additives, has a positive effect upon the relative safety of such compositions, and further, that the addition of a thixotropic thickening agent permits dispensing thereof by means of a trigger spray or pump spray apparatus.

As the carrier, or primary component of the present invention, various petroleum distillates are suitable. Exemplary petroleum distillate products encompass oils commonly employed in household products, and particularly those mineral oils having a viscosity of less than 130 SUS at 100° F., and more preferably those mineral oils having a viscosity of less than 100 SUS at 100° F. Those considered most suitable include such commonly utilized materials as mineral oil, mineral spirits, naphthenic oil, isoparaffinic hydrocarbon solvents, and the like, and mixtures thereof. In addition, the non-aqueous, non-emulsion compositions of the present invention may contain cleansing solvents commonly employed in polishes, as well as silicone oil polishes, and fragrance, color, preservative, resins, or other conventional ingredients known in the furniture polish art.

As a polishing agent, the addition of up to 10 percent by weight of a silicone oil or gum is desired, preferably from about 3 to about 7 percent, with the use of low viscosity silicone oils being preferred. The low viscosity silicone fluids which may be employed in the polish formulations of this invention have viscosities of from about 5 to about 5000 centistokes, preferably from about 10 to about 20 centistokes. It is to be noted that the viscosity of the silicone oil is not critical, since it is present in only a small percentage relative to the total composition, and is not itself effected by the presence of the suggested thixotropic thickener. Suitable silicones may be used either "stripped" or "unstripped", wherein un-stripped silicones contain lower viscosity, lower molecular weight volatile fractions in addition to the primary siloxane. a stripped silicone contains essentially no lower viscosity, volatile fraction. Unstripped silicones have the added advantage of being less costly than stripped silicones, while also enhancing the performance of the furniture polish by making it easier to wipe, and by providing a drier film.

Silicone oils useful in the present invention may be substituted with any organo-groups known in the silicone art, provided the silicones are not toxic. In addition to utility, economic considerations play a part in formulation. For example, while a phenylmethyl silicone is within the scope of the silicone fluids useful in the present invention, the cost thereof makes its use in commercial products unlikely. Suitable unstripped silicone fluids include polydimethylsiloxanes, and may be purchased, for example, from Wacker Silicones Corporation.

Silicone gums suitable for use in the present invention are polysiloxane and/or silicones which may be terminated with hydroxyl, dimethyl, methylvinyl, or vinyl groups. Suitable gums exist in the form of high viscosity liquids which are not readily flowable, having viscosities of from about 11 to about 16 million centistokes. A particularly suitable silicone gum is sold by Wacker Silicones Corporation under the trade name EL POLYMER V-1200A US.

Use of a silicone gum that is in the liquid state, rather than a silicone material or wax in a solid state has numerous advantages for use in the present invention. For example, solid silicone particles larger than about 0.3 mm may cause problems by agglomeration, thus clogging the nozzle or valve of a conventional spray delivery system. Moreover, settling of silicone or wax particles upon storage decreases shelf live, while less energy is required to disperse a liquid silicone gum used in the present formulation than a solid material, thus reducing manufacturing cost.

In addition to the above silicone components, it is permissible to add up to 10 percent by weight of a wax, such as slack wax. Those waxes commonly utilized in furniture wax compositions are considered suitable for the present invention.

While furniture polishes may be prepared in accordance with the above, comprising a mineral oil solvent or carrier and a silicone oil polishing agent, plus conventional surfactants, coloring agents, perfumes, and cleansing agents, the present invention is considered to further constitute an improvement over such furniture polishes, in that the compositions of the present invention are considered less hazardous for household use, and may be packaged in a spray container.

In addition to the above furniture polish materials, the present invention also comprises an aversion or bittering agent, present in an effective amount to strongly discourage any one from ingesting even a small amount. While any bittering or aversion agent may be employed, such as materials selected from the group consisting of denatonium benzoate, denatonium saccharide, denatonium chloride, sucrose benzoate, quinine, quinine hydrochloride, quinine sulfate, brucine, brucine sulfate, quassia, quassin, naringin, limonin, phenylthiocarbamide, quebracho, sucrose octaacetate, quercetin, berberine, and combinations thereof, the most preferred aversion material for use in the present invention is denatonium benzoate, commercially available from Macfarlan Smith Limited, Scotland, as Bitrex™. Bitrex™, widely known as among the most bitter compositions in the world, has been found to be particularly useful in the present invention due to the relatively low concentrations thereof required. For example, it has been found that as little as 0.01 percent by weight of a 25% solution of Bitrex™ in mineral oil is effective in bittering a petroleum distillate based household product to the extent that a child (or even an adult) would be highly unlikely to ingest more than a minute quantity. Effective amounts of the bittering agents will vary in accordance with the specific bittering or aversion agent employed, but it has been found that from about 0.0010 to about 0.050 percent by weight of denatonium benzoate is effective, with from 0.0025 to about 0.010 percent by weight, based upon the total weight of the petroleum distillate composition, is preferred. While some difficulty may be encountered in solubilizing the bittering agent, such as denatonium benzoate, in the petroleum distillate utilized in the present invention, such as mineral oil, a small amount of ethanol may be employed as a solubilizing agent to achieve dispersal of the agent in the oil.

While the above compositional components comprise the basic furniture polish of the present invention, it has been further found that additional product hazard reduction may be achieved by the further modification of the properties of the product by addition of a shear thinning thixotropic thickener, allowing the polish to be dispensed more conveniently by means of a non-pressurized spray mechanism or pump dispenser. Preferably such a spray dispenser comprises a reduced volume spray mechanism and a removal resistant neck closure such that the spray unit may not be readily removed, and the container may not be readily opened.

A very limited number of such thickeners have been found to be of value in the present invention. One such thixotropic thickener is Versagel™ M 1600, a mineral oil/Kraton® block copolymer composition available from Penreco. Kraton® is a commercially available thermoplastic rubber type polymer, sold by Shell Chemical Company. This oil/copolymer material, as described in U.S. Pat. No. 5,879,694, (incorporated herein by reference) has been used in the past for the manufacture of gel candles, but has now been found to act as a thixotropic thickener when mixed with petroleum distillates in the absence of water. Such block copolymer blends with hydrocarbon oil, such as paraffinic oil, naphthenic oil, natural mineral oil, and particularly white oil, constitute a preferred shear thinning thixotropic thickener for use with non-aqueous petroleum distillate products.

Another suitable thickener has been found to be N-Lauroyl glutamic acid di-n-butylamide. In one attempt at thickening a mineral oil, addition of this thickener resulted in a viscosity of 2000 SUS at 100° F., but the oil was capable of being sprayed.

Such thixotropic thickeners may be used quite sparingly, since the addition of very small amounts thereof will cause the viscosity of the petroleum distillate to increase rapidly. For example, the addition of 9.00 percent of Versagel™ M 1600 to mineral oil having a viscosity of 50 SUS rapidly results in a thickened composition having a viscosity of 180 SUS. It may be seen that the addition of excessive thickener may result in a composition which, even with shear thinning properties, will be too viscous to be sprayed. By careful selection of the appropriate thixotropic thickening agent for any specific petroleum distillate, one may thicken the chosen petroleum distillate in such a manner that it may be applied to a surface by means of a trigger spray mechanism, while still maintaining a high viscosity at rest, so as to be packaged in a conventional container without requiring special packaging called for by the CPSC. For purposes of the present invention, it is suggested that from about 0.1 to about 15 percent by weight of the thickener be present in the thickened petroleum distillate product. Preferably, the thickener should be present in an amount of from about 0.2 to about 12 percent by weight, and more preferably from about 0.2 to about weight 9 percent.

In addition to the above components, the use of a hydrocarbon solvent/cleansing agent is recommended. Suitable solvent/cleansing agents are known in the polish art, and include mineral spirits, kerosene, d-limonene, and 1,1,1 trichloroethane. Of these, the use of d-limonene, a terpene, is preferred, in an amount of from about 3 to about 7 percent by weight.

In summary, the preferred components of a furniture polish in accordance with the present invention may comprise from about 75 to about 90 percent by weight mineral oil, from about 3 to about 7 percent by weight silicone fluid, and from about 3 to about 7 percent by weight d-limonene cleansing agent. Such a composition is suitable for application to a surface for polishing said surface, and be packaged in child-resistant packaging. While the addition of a bittering or aversion agent will make such a furniture polish less hazardous for household usage, the addition of a shear thinning thixotropic thickener, as set forth above, permits packaging of the polish in a non-pressurized spray container for application to a surface as a mist or spray.

A preferred example of a furniture polish within the scope of the present invention is set forth below. The viscosity of the composition was measured, and found to be 110 SUS at 110° F. This furniture polish composition was placed in a non-pressurized spray bottle with trigger spray mechanism and nozzle, and sprayed upon a table surface. The polish was deposited as a fine mist, and was easily spread to form a uniform coating which dried to a high gloss finish. A small amount of the polish was sprayed upon a surface, collected, evaluated, and found to immediately return to high viscosity. Conversely, it was found that a test oil having a viscosity of 60 SUS at 100° F., absent the thixotropic thickener of the Example, was not capable of being dispensed as a spray through the same trigger spray mechanism and nozzle.

| Percentage | Component | Function |
|---|---|---|
| 80.48 | Mineral Oil - 50 SUS | Solvent/Cleaner |
| 8.50 | Versagel ™ M 1600 | Thixotropic thickener |
| 4.00 | d-Limonene | Cleaner/Solvent |
| 5.00 | Silicone Oil - 20 centistokes viscosity | Polish |
| 1.00 | Orange Blast RN-2259 | Perfume |
| 0.0020 | Sandoplast Yellow F3G | Azo dye |
| 0.0002 | Cl Solvent Red 27 | Dye |

-continued

| Percentage | Component | Function |
|---|---|---|
| 0.0200 | Bitrex ™ Solution (25% in ethanol) | Bittering Agent |
| 1.00 | Mazol ™ PG031K Monooleate | Surfactant/solubilizer |

INDUSTRIAL APPLICABILITY

A furniture polish suitable for dispensing from a non-pressurized spray container may be prepared from conventional petroleum distillate products and silicone oil polish materials commonly employed for furniture polish compositions, by the addition of shear-thinning thixotropic thickeners and an aversion agent.

We claim:

1. A furniture polish composition comprising from about 75 to about 90 percent by weight mineral oil, from about 3 to about 7 percent by weight silicone fluid, and from about 3 to about 7 percent by weight hydrocarbon cleaner.

2. The furniture polish of claim 1, further comprising an aversion agent.

3. The furniture polish of claim 2, further comprising a shear-thinning thixotropic thickener.

4. The furniture polish of claim 3, wherein said aversion agent comprises a composition selected from the group consisting of denatonium benzoate, denatonium saccharide, denatonium chloride, sucrose benzoate, quinine, quinine hydrochloride, quinine sulfate, brucine, brucine sulfate, quassia, quassin, naringin, limonin, phenylthiocarbamide, quebracho, sucrose octaacetate, quercetin, berberine, and combinations thereof.

5. The furniture polish of claim 3, wherein said thickener is selected from the group consisting of mixtures of a triblock copolymer and hydrocarbon oil, and N-Lauroyl glutamic acid di-n-butylamide, and comprises from about 0.1 to about 15 percent by weight of the polish.

6. The furniture polish of claim 5, further comprising from about 0.0010 to about 0.050 percent by weight of an aversion agent selected from the group consisting of denatonium benzoate, denatonium saccharide, denatonium chloride, sucrose benzoate, quinine, quinine hydrochloride, quinine sulfate, brucine, brucine sulfate, quassia, quassin, naringin, limonin, phenylthiocarbamide, quebracho, sucrose octaacetate, quercetin, berberine, and combinations thereof.

7. The furniture polish of claim 6, wherein said aversion agent comprises denatonium benzoate, and said thickener comprises from about 0.2 percent to about 9 percent by weight of said polish.

8. The furniture polish of claim 7, wherein said thickener comprises from about 2 percent to about 30 percent triblock copolymer and from about 70 to about 98 percent hydrocarbon oil.

9. The furniture polish of claim 8, wherein said cleaner comprises d-limonene.

10. A furniture polish suitable for non-pressurized spray dispensing, said polish consisting essentially of a mineral oil, a silicone fluid, a bittering agent, and a shear-thinning thixotropic thickener.

11. The furniture polish of claim 10, wherein said mineral oil comprises from about 75 to about 90 percent by weight of the composition, and said silicone fluid comprises from about 3 to about 7 percent of the composition.

12. The furniture polish of claim 11, wherein said shear-thinning thixotropic thickener comprises from about 0.2 to about 9 percent by weight of the polish, and is selected from the group consisting of mixtures of a triblock copolymer and hydrocarbon oil, and N-Lauroyl glutamic acid di-n-butylamide.

13. The furniture polish of claim 12, wherein said thickener comprises from about 2 percent to about 30 percent triblock copolymer and from about 70 to about 98 percent hydrocarbon oil.

14. The furniture polish of claim 13, wherein said bittering agent comprises denatonium benzoate, present in a concentration of from 0.001 to about 0.050 percent by weight of the polish.

15. The furniture polish of claim 13, wherein said polish exhibits a viscosity of greater than 100 SUS at 100° F.

16. The furniture polish of claim 15, further comprising from about 3 to about 7 percent by weight hydrocarbon cleaner.

17. The furniture polish of claim 16, wherein said hydrocarbon cleaner comprises d-limonene.

18. A furniture polish consisting essentially of from about 75 to about 90 percent mineral oil, from about 3 to about 7 percent by weight silicone fluid, from about 0.001 to about 0.025 percent by weight bittering agent, and about 0.2 to about 9 percent by weight shear-thinning thixotropic thickener.

19. The furniture polish of claim 18, wherein said bittering agent comprises denatonium benzoate, and said thickener comprises from about 2 percent to about 30 percent triblock copolymer and from about 70 to about 98 percent hydrocarbon oil.

20. The furniture polish of claim 19, wherein said polish exhibits a viscosity of greater than 100 SUS at 100° F.

* * * * *